July 2, 1940.　　　W. B. HUTCHINGS　　　2,206,356
CHECK VALVE

Filed Oct. 13, 1936

WITNESS.
Nelle Jacker

INVENTOR.
Walter B. Hutchings
BY Richard J Jacker
ATTORNEY

Patented July 2, 1940

2,206,356

UNITED STATES PATENT OFFICE 2,206,356

CHECK VALVE

Walter B. Hutchings, Huron, S. Dak.

Application October 13, 1936, Serial No. 105,392

1 Claim. (Cl. 137—69)

The invention relates to a check valve which is placed in a line of pipe and may be used in either a horizontal position or a vertical position. The movable valve is made to slide a considerable distance and is so constructed that it will never clog or be prevented from sliding and the main object of this valve is to eliminate all chattering of the movable valve thus making the valve of long life and very efficient. Another object of this check valve is to have a pipe union at each end so that the same can be removed from its connections in a pipe line without disturbing the pipe.

Figure 1:
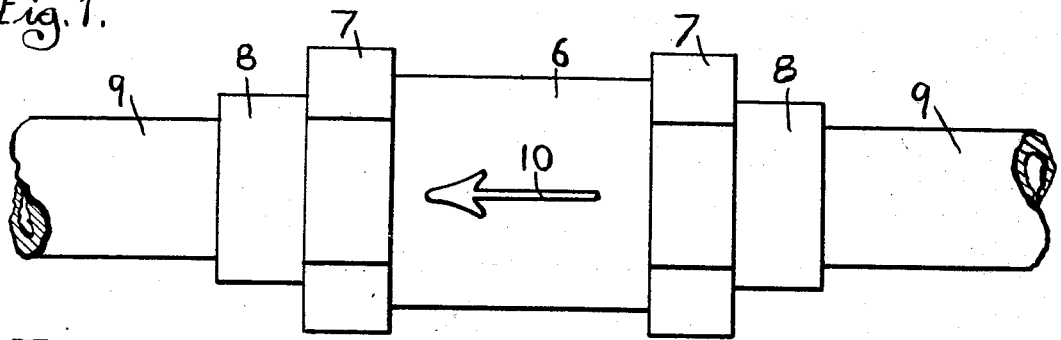
Figure 2:
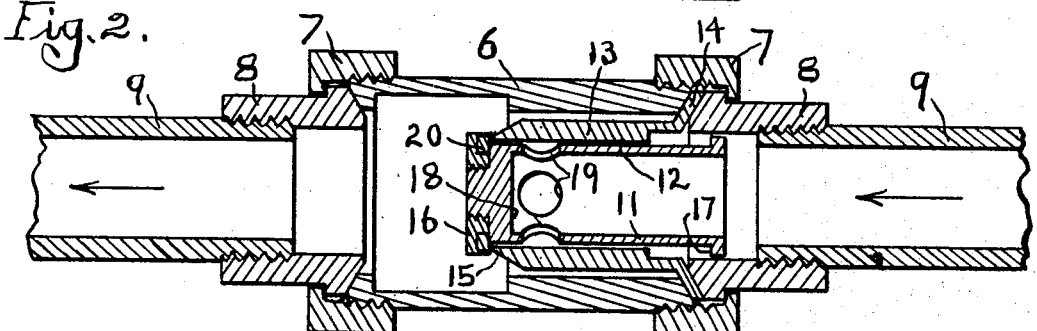
Figure 3:
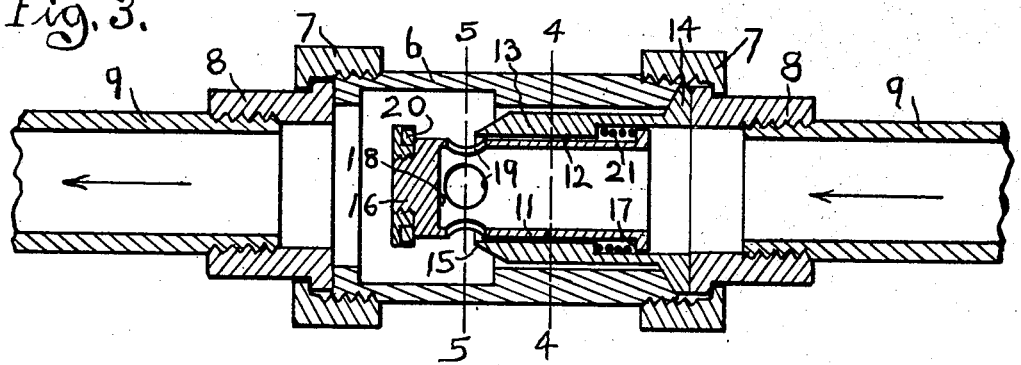
Figure 4:
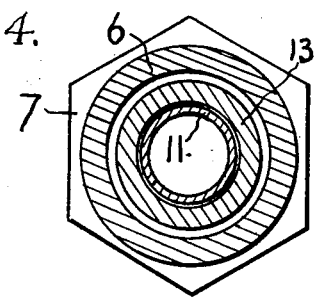
Figure 5:
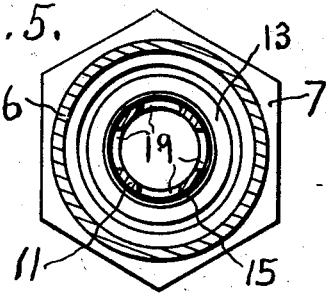

To describe the invention so that others versed in the art to which it pertains can make and use the same it is illustrated on the accompanying sheet of drawings, forming a part of this specification and in which:

Figure 1 is a side elevation of a valve constructed in accordance with my invention; Figure 2 is a longitudinal sectional view of the same showing the valve in a closed position; Figure 3 is a similar view showing the valve in an open position with some modifications in construction; Figure 4 is a sectional view taken on line 4—4 of Figure 3, and Figure 5 is a sectional view taken on line 5—5 of Figure 3.

As clearly illustrated the valve casing 6 is made of the desired size and length and is provided at each end with screw threads to receive the outer members 7 of the unions whose inner members 8 are screwed to the end of the pipes 9. The outside of the valve casing 6 is preferably provided with one or more arrows 10 to indicate in what direction the fluid is free to flow.

The movable valve is constructed of a tubular portion 11 which is made to freely slide in a hole 12 provided in the valve cage 13 which has at one end the outwardly extending flange 14 tightly clamped between the inner member 8 of the union and the end of the valve casing 6. The outer member 7 of the union is tightly screwed onto the valve casing 6 to prevent any leakage between the parts. The other end of the valve cage 13 is provided with a valve seat 15 arranged to be engaged by the valve cap 16 rigidly secured to the one end of the tubular portion 11, the remaining end of the tubular portion 11 being provided with a shoulder 17 to serve as a stop against the one end of the valve cage 13.

The hollow part of the tubular portion 11 extends to a short distance from the valve cap 16 at 18 and is open at the other end. A plurality of holes 19 are shown through the tubular portion 11 a considerable distance from the valve cap 16 and fibre washer 20 which form a free passage for the fluid within the tubular portion to enter the interior of the valve casing 6 when the valve is in a considerable open position as shown in Figure 3. The valve cap 16 is preferably provided with a fibre washer 20.

In Figure 3 the end surfaces of the inner members 8 of the unions are shown flat instead of being beveled as shown in Figure 2 so that the valve casing 6 can be removed from the pipe line without in the least disturbing the pipes 9 after the outer members 7 have been screwed loose or disconnected from the valve casing 6.

It will be understood that the valve cage 13 and the movable parts therein are replaced whenever the parts become worn or leaky. As shown in Figure 3 a very light coiled expanding spring 21 may be provided as shown to normally hold the valve in a closed position.

In operation the check valve is placed in proper position in the pipe line to permit the fluid within the pipe line to flow freely in the direction indicated by the arrows in Figures 2 and 3 and prevent any flow in the opposite direction. From long experience it has been found that when check valves are placed in a pipe line containing pressure and a liquid is depended upon to operate the check valve, that the valve will under certain conditions chatter and such chattering of the movable valve will soon wear the parts and cause the valve to leak. The construction and operation of this valve is such that there is never the slightest amount of chattering produced and for that reason parts comprising the valve and cage require replacement very seldom. The tubular portion 11 fits loosely in the hole 12 so that if the valve is unseated only slightly and not sufficient to have the holes 19 pass beyond the seat 15 a small amount of fluid may pass between the tubular portion 11 and the wall of hole 12 and out between the valve seat 15 and the valve cap 16; and when a portion of the holes 19 pass the valve seat 15 a greater amount of fluid may pass into the interior of valve casing 6, and when the holes 19 are entirely beyond the valve seat 15 the entire amount of fluid passing through the pipe line 9 is free to pass the valve. Obviously as soon as there is any reverse flow of fluid in the pipe line 9 the valve will be moved to a closed position.

Having thus fully described my invention what I desire to secure by Letters Patent of the United States is:

In combination, a casing provided at each end with a male screw thread, flanges secured at each end of said casing provided with screw threads to fit the screw threads on the casing, said casing forming a union between said two flanges, one end of said casing provided with a beveled circular surface, a tubular valve cage to fit loosely within said casing to provide an annular space between the cage and inner wall of the casing, said cage provided with a beveled circular flange clamped against the beveled circular surface of said casing by the adjacent one of said flanges, the tubular bore of said valve cage being of two different sized diameters to form a shoulder within said valve cage, said valve cage provided with a valve seat on its end opposite the said beveled circular flange, a valve arranged to engage said seat and provided with a hollow stem to fit loosely within the smaller bore of said valve cage to provide for limited passage of fluid on initial opening movement of said valve and provided on its end opposite the valve with an outwardly extending flange of greater diameter than the smaller bore of said valve cage to engage said shoulder to limit movement of said valve cage in one direction and suitable openings through the wall of said hollow valve stem a considerable distance from the valve to form communication between the interior of said hollow stem and the interior of said casing when said valve is opened a sufficient distance to expose said openings above the seat.

WALTER B. HUTCHINGS.